United States Patent [19]

Hardigg et al.

[11] Patent Number: 4,495,260
[45] Date of Patent: Jan. 22, 1985

[54] SLIDING SEAL LEAD BUSHING

[75] Inventors: James S. Hardigg, Conway; E. Wayne Turner, Deerfield, both of Mass.

[73] Assignee: Hardigg Industries, Inc., South Deerfield, Mass.

[21] Appl. No.: 482,881

[22] Filed: Apr. 7, 1983

[51] Int. Cl.³ .................. H01M 2/22; H01M 2/30
[52] U.S. Cl. .................................. 429/180; 429/181
[58] Field of Search ............. 429/180, 181, 184, 178, 429/179, 183, 182

[56] References Cited

U.S. PATENT DOCUMENTS

| 3,064,068 | 11/1962 | Fouch | 429/180 |
| 3,652,340 | 3/1972 | Sharpe et al. | 429/184 |
| 4,212,934 | 7/1980 | Salamon | 429/181 |

FOREIGN PATENT DOCUMENTS

| 2805715 | 2/1978 | Fed. Rep. of Germany | 429/181 |
| 2721512 | 9/1978 | Fed. Rep. of Germany | 429/180 |
| 2130073 | 3/1972 | France | 429/178 |
| 2359517 | 3/1978 | France | 429/178 |

Primary Examiner—Donald L. Walton
Attorney, Agent, or Firm—Cushman, Darby & Cushman

[57] ABSTRACT

A battery terminal post sealing system comprised of a bushing assembly designed to be mounted onto terminal posts subsequent to the battery cover installation. The bushings are designed to permit larger terminal post receiving holes in battery covers and also to provide a secure lead-to-lead seal with the terminal post and a sliding seal with the battery cover to easily accommodate growth of the positive plates.

13 Claims, 4 Drawing Figures

U.S. Patent    Jan. 22, 1985    4,495,260
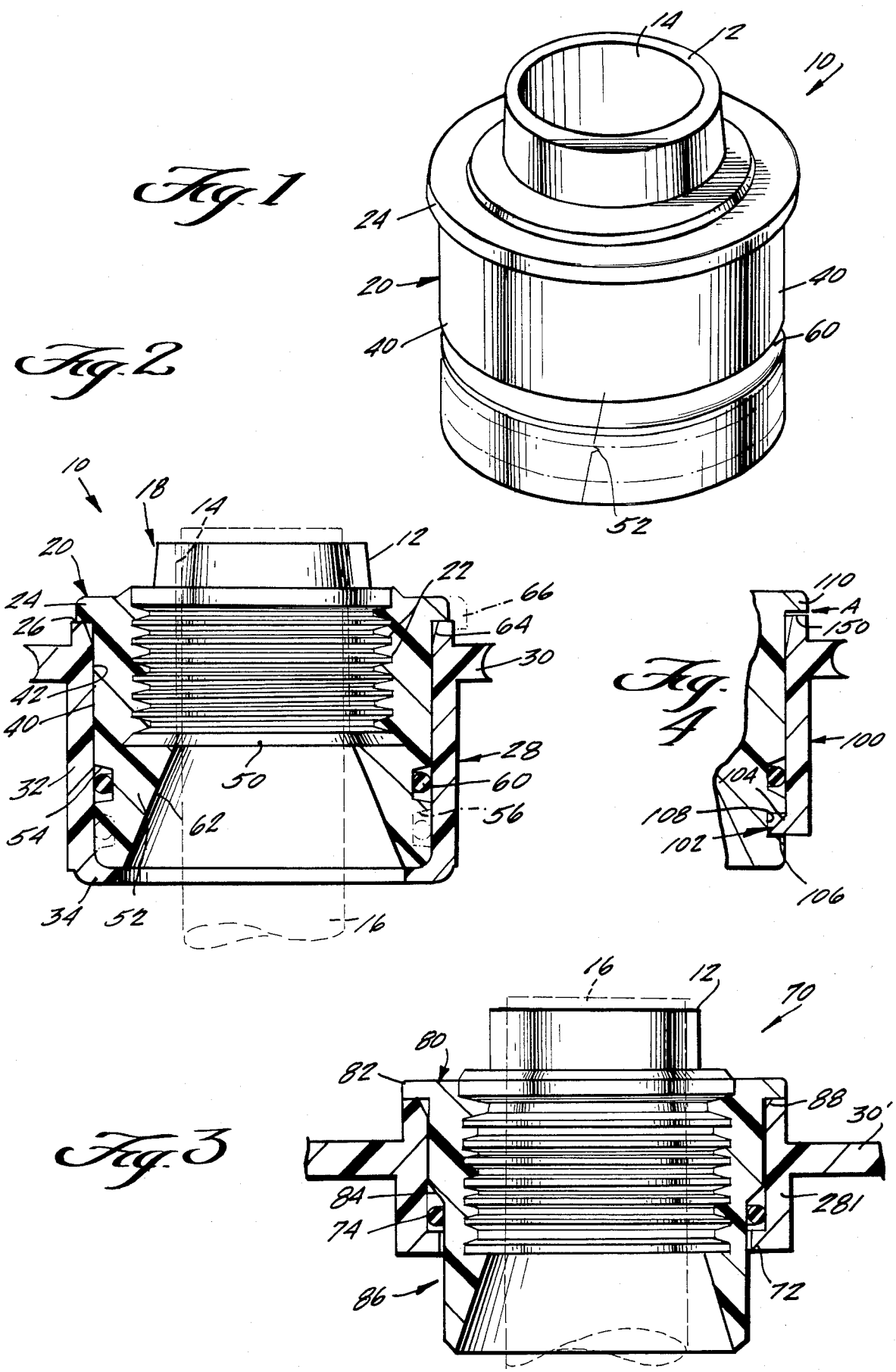

SLIDING SEAL LEAD BUSHING

FIELD OF THE INVENTION

The present invention concerns a slidable sealing system for battery terminal posts that aids in automating battery formation processes.

BACKGROUND OF THE PRESENT INVENTION

Construction of electric batteries, especially industrial batteries, has recently been undergoing substantial changes. Not the least has been the automation of many construction steps, including the automatic placement and sealing of battery covers onto their corresponding jars.

It is a well known fact that the terminal posts, connected integrally or otherwise to the charge plates included within the battery jar, often cause problems in such automated construction efforts. This is because they are not always properly angled or sufficiently aligned to be properly received within the narrow tolerances provided in openings therefor. Since it is important to prevent the leaking of battery acid from between terminal post and cover connections, the components comprising the cover-to-post connection must be accurately formed and aligned in order to be properly sealed. Ideally, cover openings for terminal posts would be formed with a close tolerance relative to terminal post design, on the order of 0.030 inch diametrical clearance. To the extent the cover openings are incorrectly sized or positioned, or the terminal posts were not themselves accurately formed, either as to size or positioning, leakage and production problems could result.

Likewise, it is well known that while the negative terminal posts do not grow or move vertically within the battery, the positive terminal posts do grow and increase in height over the life time of the battery since the positive plates, to which the positive posts are attached, can lengthen as a result of chemical change. Such growth must be accommodated, however, and the present invention creates a post-to-cover connection that seals and accommodates such plate growth while dramatically improving automatic cover installation procedures.

One well known technique of sealing between a cover opening and a terminal post is by using a solid rubber bushing which is forced over the terminal post and into the space between the post and the cover. The capacity to both seal and allow for positive plate growth depends on the dimensional accuracy and resilience of the rubber bushing during the life of the battery. Also, as the positive post pushes up through the rubber bushing, some of the corroded outer surface of the post which has been exposed to acid below the bushing passes up into the bushing where it can continue to corrode and eventually cause leakage of acid. Other examples of sealing systems for use at post-to-cover connections can be found in the following patents.

Rigid terminal post and cover structures are shown in Shannon, U.S. Pat. No. 2,663,758 and Ohya et al, U.S. Pat. No. 4,127,707, both of which show an exterior terminal post molded into a cover. Lead terminal bushings have been molded directly with covers for a number of years, and an example is shown in Hayes, Jr. et al, U.S. Pat. No. 3,957,539.

Other examples of terminal post sealing systems employed following cover installation include Skinner et al, U.S. Pat. No. 1,402,673, Beetem, U.S. Pat. No. 1,960,200 and Chassoux, U.S. Pat. No. 3,578,506. Skinner et al shows a molten sealant that is placed within the opening, in the form of a well and the sealant fills the well about the exterior of the terminal post forming a rigid connection. Beetem discloses a sealing structure wherein the sealant is held within a hollow portion of the terminal post with the sealant being forced out between the terminal post and cover when a terminal bolt is screwed in place within the hollow post. British Pat. No. 1,372,407 is somewhat similar as a sealing resin is injected through a channeled terminal post into a cover sealing well. Reference can also be made to Adderley, U.S. Pat. No. 3,918,993 where softened polypropylene is injected through a hollow terminal post to form a rigid seal between that post and the battery cover.

In Crassoux, a relatively large diameter in the cover is provided and the diameter of the post is less than the minimal diameter of the opening. However, a sealing gasket having an outer diameter substantially equal to the diameter of the cover opening and an internal opening with a diameter substantially equal to the outer diameter of the terminal post. This gasket is wedged between the cover and post structure by means of a bolt assembly which uses threads formed directly on the terminal post itself. In each of these instances, however, the resulting seal is rigid and would not permit growth of the sealed terminal post.

British Pat. No. 418,768 discloses a structure wherein the opening in the cover through which the terminal post extends is provided with a rubber ring or coating and the terminal post as provided with a separate rubber coating. When the terminal post is inserted through the opening, the two rubber surfaces engage and form a seal therebetween.

German Offenlegunsschrift No. 2420879 discloses the concept of employing a pitch or resin packing material within a cover well surrounding the terminal post with the packing serving to provide the seal between the cover and terminal post. While some clearance is shown between the opening into the well area and the post, the tolerance must be small enough to prohibit the packing from leaking into the battery. It is not clear whether the post could move relative to the cover.

The Babusci et al U.S. Pat. Nos. 3,434,883 and 3,490,954 disclose a concept wherein a battery cover is provided with a plurality of openings with a depending sleeve integrally formed therebelow. Terminal posts fit very tightly within that opening and O-rings are provided therebetween to both limit lateral movement and act as a secondary seal. The primary seal is a flexible tube of an acid-resistant material one end of which extends about the exterior of the depending sleeve, the other end being fitted around the terminal post.

In Sharpe et al, U.S. Pat. No. 3,652,340, the cover includes post openings defined by depending sleeves. An adhesive coating is formed directly on the terminal post and a one-piece flexible tube assembly is positioned over the post and sealed to it. The tube includes a depending portion which is not sealed to the post but is turned back upon itself so as to extend outwardly over the depending sleeve through which the terminal post extends. That portion of the flexible tube bent back over the depending sleeve provides the primary seal. The post is spaced from the interior of the sleeve and a plurality of sealing ribs are provided on the flexible tube structure adhered to the post and these ribs provide a secondary seal. Such a sealing arrangement must be formed prior to rather than following cover installation.

Hubbauer et al, U.S. Pat. No. 3,678,178, relates to a battery terminal seal which can withstand high pressures and is comprised of an inner plastic bushing about which a metal sleeve has been formed with the plastic bushing being deflected radially outwardly when axially compressed by a nut at the end of the terminal post.

Salamon et al, U.S. Pat. No. 4,075,368, discloses a multiple component post connection for producing a highly conductive but rigid connection. The terminal post itself is a composite structure formed from an internal tinned copper sleeve on which a lead mantle and a pole bridge have been integrally cast. The lead mantle is in direct contact with and passes through a lead receptacle formed with a synthetic plastic coating on its outer surface. This receptacle in turn fits within a sleeve depending from the cover. The two contacting lead portions are subsequently welded together and produce a rigid lead-to-lead connection and the depending sleeve and the plastic coating on the lead receptacle are ultrasonically welded together to form a liquid-tight seal about the entire post assembly.

Salamon, U.S. Pat. No. 4,212,934, concerns a sliding seal where a plastic mantle is cast directly onto the terminal post. In one embodiment the mantle cast on the terminal post is provided with a plurality of integrally formed, outwardly extending ribs which slide along a cylindrically shaped opening within the battery cover. In the second embodiment a groove has been formed about the mantle and a single O-ring lies in the groove providing the sliding seal between the mantle and the cover structure. In each instance, however, the battery posts and the cover openings must be formed with a high degree of accuracy as the size of the cover opening must be such as will precisely receive the terminal post, the integrally cast mantle structure and the projecting sealing ribs or O-ring.

The teachings do not recognize the problem of imprecisely oriented terminal posts nor how this affects automated battery construction which will allow cover installation to be followed by terminal post sealing. Likewise, there has been no recognition of how to solve the sizing and alignment problems that can result with respect to batteries, battery covers and terminal posts.

SUMMARY OF THE INVENTION

We have found that automated production problems associated with sealing covers onto filled and completed battery jars, especially where the terminal posts are not correctly oriented, can be greatly improved if the openings provided in such covers can be formed with a relatively much larger diameter opening than that of the terminal post to be received therein. This, of course, restricts the type of available post-to-cover sealing approaches as the final sealing therebetween must still be accomplished and it must be done from the exterior of the battery. The present invention allows use of covers having greatly enlarged post openings and simultaneously creates an effective sliding seal for accommodating plate growth. This is accomplished by employing a separately formed bushing assembly that can be installed after cover installation over the terminal posts in a battery from the exterior of the battery.

The bushing assembly is comprised of a separate lead core element on which a one-piece synthetic mantle element is cast. We prefer to have the mantle element extend some distance below the lead core and one or more grooves are formed about the exterior of the mantle in that depending portion. The cover openings are formed as depending sleeves, integral with the cover, with the sleeve having an internal diameter providing a clearance about the terminal post to be received therein which is about ten to twenty times that normally employed. The lead core, however, is formed with a central opening sized to fit precisely over the terminal post and it will ultimately be melted onto the terminal post to form them into an integral unit.

The outer diameter of the mantle is sized to be complementary to the internal diameter of the cover sleeve. An O-ring is placed in the groove, or in each groove if more than one is used, in the depending portion of the mantle and it is the O-ring that provides the sliding seal between the mantle and sleeve. Preferably, the bottom edge of the cover sleeve is provided with an inwardly extending curve or flange member, which can be shaped in a complementary fashion to the bottom edge of the mantle, and this serves to prevent or retard splashing of acid toward, onto and into the area between the mantle and the sleeve.

The terminal post or posts can be received within the cover openings even if quite badly bent from the intended vertical position which will allow the cover to fit on the battery jar and welded in place in spite of a range of cover opening-terminal post alignment problems. Thereafter, where necessary, each post can be properly straightened and aligned within its cover opening and the bushing assembly installed. Thus, both ease of cover installation and precise sealing between the post and cover can be achieved.

In an alternative embodiment, an undercut reduced diameter portion is provided on the mantle with the undercut portion extending from a predetermined point approximately halfway down the side wall of the molded mantle to the bottom thereof and an O-ring is positioned on the undercut area. The present invention also allows the use of this sealing approach for a seal about negative terminal posts where it might be desirable to lock that terminal and the cover together.

All the embodiments also include an outwardly extending annular flange or cap member designed to overlie the upper edge of the sleeve on the cover.

BRIEF DESCRIPTION OF THE DRAWINGS

The preferred exemplary embodiment can be understood with reference to the drawings in which:

FIG. 1 is a diagrammatic perspective exterior view of the bushing assembly of the present invention;

FIG. 2 is a diagrammatic side elevational view, partly in cross-section, of the bushing assembly shown in FIG. 1;

FIG. 3 is another embodiment of the bushing assembly accoridng to the present invention;

FIG. 4 is a diagrammatic cross-sectional view of an alternative bushing structure for use with negative terminal posts to lock them to the cover.

Other objects, features, and characteristics of the present invention, as well as the methods and operation and functions of the related elements of the structure, and to the combination of parts and economies of manufacture, will become more apparent upon consideration of the following detailed description and the appended claims with reference to the accompanying drawings, all of which form a part of this specification, wherein like reference numerals designate corresponding parts in the various figures.

DETAILED DESCRIPTION OF THE PREFERRED EMBODIMENTS OF THE PRESENT IVNENTION

Turning now to the drawings, the primary embodiment is set forth in FIGS. 1 and 2 and reference to those Figures will continue until alternative embodiments are described.

The invention is a sealing system and includes as the principle element a bushing assembly, generally referred to at 10, comprised of an internal lead core 12 itself provided with an internal cylindrically shaped bore 14 through which a terminal post (shown in phantom in FIG. 2 at 16) will ultimately be received. The clearance between opening 14 and terminal post 16 is preferably quite close but should at least be close enough to permit the two members to be melted together at least in their upper portions, generally indicated at 18 in FIG. 2, following cover installation and straightening of the post.

An outer synthetic mantle, generally indicated at 20, is integrally cast about the periphery of lead core 12 with that core being provided with a plurality of spaced apart annular ribs 22 which define grooves therebetween into which the molded mantle 20 will extend as shown in FIG. 2. Mantle 20 is also provided with an annular flange 24 extending outwardly from its top edge which can extend over the upper edge 26 of a mounting sleeve, generally indicated at 28, integrally formed as part of cover 30. Mounting sleeve 28 includes a depending portion 32 which terminates at an inwardly turned flange 34. The interior dimensions and surfaces of sleeve 28 is shaped to be complementary to the periphery of the mantle. In that regard mantle 20 includes an exterior sidewall 40 which, as shown in FIG. 2, will lie substantially against the interior wall 42 of sleeve 28.

The lead core 12 terminates at a bottom rib 50 and mantle 20 extends below that point. The depending portion of mantle 20 is shown at reference numeral 52. Within the exterior side wall 40 of depending portion 52, one or perhaps two circumferentially extending channels or grooves can be provided, one being shown in full line at 54 and a second being shown in phantom at 56. In FIG. 1, one groove is shown in a full line and a second is indicated by the phantom lines extending about mantle 20 therebelow. An O-ring 60 is shown as being mounted within channel or groove 54 and O-ring 60 will provide the primary sealing between mantle 20 and the interior surface 42 of sleeve 28. The inwardly turned flange 34 at the bottom of sleeve 28 will provide some measure of splash resistance and retard the flow of acid due to splashing and movement of the battery from getting into the surface between mantle 20 and cylinder 28. The interior of mantle 20 in that area below core 12 is preferably tapered as indicated at 62 which will help guide the bushing assembly 10 onto terminal post 15 once it is desired to do so.

In order to initially aid the mounting of bushing 10 into sleeve 28, the interior portion of the upper rim of sleeve 28 is beveled as at 64 and that beveled area is covered by flange 24. As shown in phantom on the right side of FIG. 2, flange 24 could also be formed as an overhanging rim such as is indicated in phantom at 66.

O-rings 60 are preferably comprised of a 70 durometer rubber material, with the preferred material being a fluorinated rubber although neoprene or EPR could also be used. One example is a Parker Model 2-124 O-ring. Elastomeric ring-seals having cross-sections other than round such as crosses and U-shapes can also be used. Mantle 20 is preferably comprised of a polypropylene although other rigid heat resistant plastic materials could be used. It is important that whatever material is used for mantle 20 that it not readily transmit heat which will be developed during the burning together of the lead core 12 and terminal post 16. Lead alloys commonly used, such as a 3% antimony-lead mixture, melt at about 583° F. and it is preferred to confine the heat of burning the core and terminal post together to the upper portions of the bushing structure. In order to protect the O-rings, they are preferably located in the area 52 of mantle 20 which depends below the area where core 12 is cast within the mantle structure.

What is important with respect to the sizing between terminal post 16 and the internal diameter of sleeve 28 is that there be a relatively great deal of space provided therebetween. The space left between the internal diameter of the cover opening, in this case a depending hollow sleeve, and the terminal post would normally be about 0.030 inch in order to allow melting of the post and bushing and prevent lead "run down", meaning the flow of molten lead between the two vertical surfaces. Here, the preferred range for spacing provided between the terminal post and the depending sleeve varies from about 0.300 to about 0.600 inch. The minimal thickness of the lead bushing can vary from 0.125 to 0.188 inches and the O-ring diameter can vary, at a minimum, from about 0.060 to about 0.150 inch. It will be noted that the spacing left in the present invention is from about 10 to about 20 times that normally provided in close tolerance situations and this will accommodate a large misalignment factor. Thus, as often happens, if the terminal posts are inclined or are offset from a preferred vertical position with respect to the plane formed by the upper surface of the battery jar on which the cover is going to be mounted, the openings in the cover and of sleeve 28 should be large enough to accommodate a substantial degree of offset of the terminal posts from that preferred and ideal perpendicular position. Thus, covers 30 can be automatically placed over the battery jars wherein the terminal posts are at skewed angles with the positioning and placement of the terminal posts being able to be corrected subsequently when the bushing assemblies 10, as set forth in this application, are being installed. Typically, that occurs following the application and sealing of the cover 32 to a battery jar (not shown) wherein the outer edge of that cover and the top peripheral edge of the battery jar are welded and sealed together. Subsequently, the terminal posts can be tapped into a position where they are substantially aligned in the center of sleeves 28 and the bushings assemblies 10 can then be placed thereover followed by the joining of core 12 to the terminal post 16 through conventional sealing techniques where the two lead members are melted and fused together.

The O-ring structure and the sealing provided between mantle 20 and the interior wall surface of the sleeve 28 will provide a sliding seal to accommodate the growth of the positive terminals due to chemical change in the positive plates as the battery is charged and discharged. At the same time, this sealing technique produces an effective seal to prevent acid from leaking out of the battery. In addition, the large oversized holes provided by sleeves 28 will adequately receive badly positioned terminal posts and allow, nonetheless, the automatic placement and sealing of covers on battery jars containing such posts.

Turning now to FIG. 3, an alternative bushing assembly is generally indicated at 70 and again includes a lead core 12. A terminal post is again indicated in phantom at 16. Cover 30' is provided with a post opening in the form of a sleeve 28' having an internal diameter substantially larger than the outer diameter of the terminal posts. Sleeve 28' is also provided at its bottom edge with an integrally extending flange 72 which will serve as a stop for O-ring 74. The bushing assembly 70 includes a mantle structure, generally indicated at 80, which is also provided with an outwardly extending flange 82 at its upper edge which overlies the upper end portion of sleeve 28'.

The side wall of mantle 80 in this embodiment, however, includes a shoulder 84 approximately half way down the length of the side wall which is formed by undercutting the side wall of the mantle 80 to form a reduced diameter portion, generally indicated at 86. It is about this undercut portion 86 that O-ring 74 is placed and along which it can move. Flange 72 acts as a stop with respect to the positioning of O-ring 74.

As was true in the first embodiment, the interior of the top edge of sleeve 82' also included an initial lead-in bevelled surface which extends about its upper edge, generally indicated at 88. Thus, apart from the use of channels for O-rings in the first embodiment and the use of an undercut smaller diameter portion in the second embodiment, both embodiments serve to provide an effective sliding post-to-cover seal.

Turning now to FIG. 4, an alternative arrangement is shown for use with a negative terminal post in order to produce a locking post and cover connection. The cover sleeve 100 is modified from the sleeves shown in the other Figures by having the bottom terminate at an inwardly projecting beveled flange 102 including at least one or a pair of inwardly directed projections. In each instance the projection has a beveled upper surface 104 and a horizontal bottom edge 106. Flange or projection 102 is positioned so that the bottom groove 108 receives the projection with horizontal surface 106 lying directly adjacent the bottom horizontal edge of groove 108. In other respects the bushing and sleeve structures are the same. Accordingly, when the bushing is inserted, projection or flange 102 will fit into groove 108 when flange 110 has come against the top edge 150 of cover sleeve 100. It should be noted that a slight amount of clearance should be provided between flange 110 and the top edge 150 of sleeve 100.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What we claim is:

1. A molded integral bushing for use in sealing a battery terminal post to the cover of a battery comprising an annular member comprised of lead having a hollow interior shaped in a complementary manner to the exterior of said terminal post so that it can fit thereover and be melted thereto, said annular member having means defining at least one annular groove about the exterior thereof, a mantle formed of a synthetic material molded about the exterior of said annular member and extending a predetermined distance therebelow with that portion of the mantle positioned directly adjacent said annular member having a smooth exterior wall and sealing means positioned on the exterior of said mantle in the portion extending below said annular member for sealing the mantle to the battery cover.

2. A bushing as in claim 1, wherein the portion of said mantle extending below said annular member includes means defining an inwardly tapered opening for guiding said bushing onto the terminal post.

3. A bushing as in claim 2, wherein said sealing means comprises means defining at least one annular groove in the exterior of that portion of said mantle extending below said annular member and an O-ring within said annular groove.

4. A bushing as in claim 3, wherein said O-ring is comprised of fluorinated rubber.

5. A bushing as in claim 3, wherein said sealing means comprises a pair of said annular grooves each having a separate O-ring therein.

6. A bushing as in claim 3 further including an outwardly extending annular flange positioned at the top of said mantle.

7. A bushing as in claim 3 wherein said mantle is comprised of a plastic material.

8. A bushing as in claim 7 wherein said plastic material comprises polypropylene.

9. A bushing as in claim 1 wherein the exterior of said annular member includes a plurality of radially outwardly extending, axially spaced apart annular ribs so that a plurality of grooves are defined therebetween.

10. A bushing as in claim 1 wherein the bottom of said mantle is curved and said cover includes a depending sealing sleeve for receiving the bushing, the bottom of said sleeve further including an inwardly extending flange having a curved interior surface shaped to be complementary to the bottom of said mantle.

11. A bushing as in claim 1 wherein the cover includes a depending sealing sleeve for receiving the bushing, the bottom of said sleeve further including an inwardly extending annular flange, said bushing further including an annular groove for mating with said flange.

12. A bushing as in claim 11 wherein said annular flange on said sealing sleeve includes a beveled upper surface and a flat bottom surface.

13. A bushing as in claim 3 wherein said mantle includes a second annular groove spaced axially from said at least one annular groove.

* * * * *